UNITED STATES PATENT OFFICE.

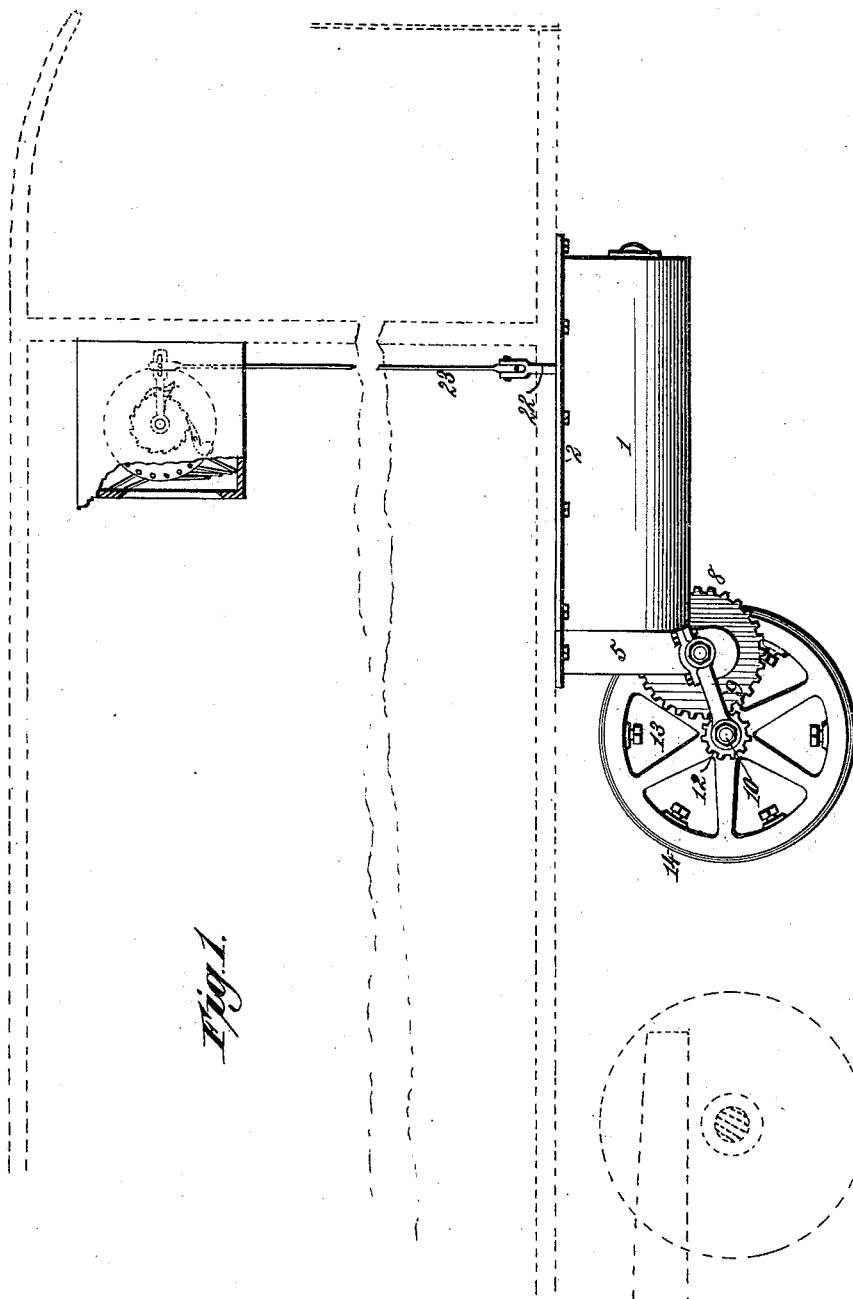

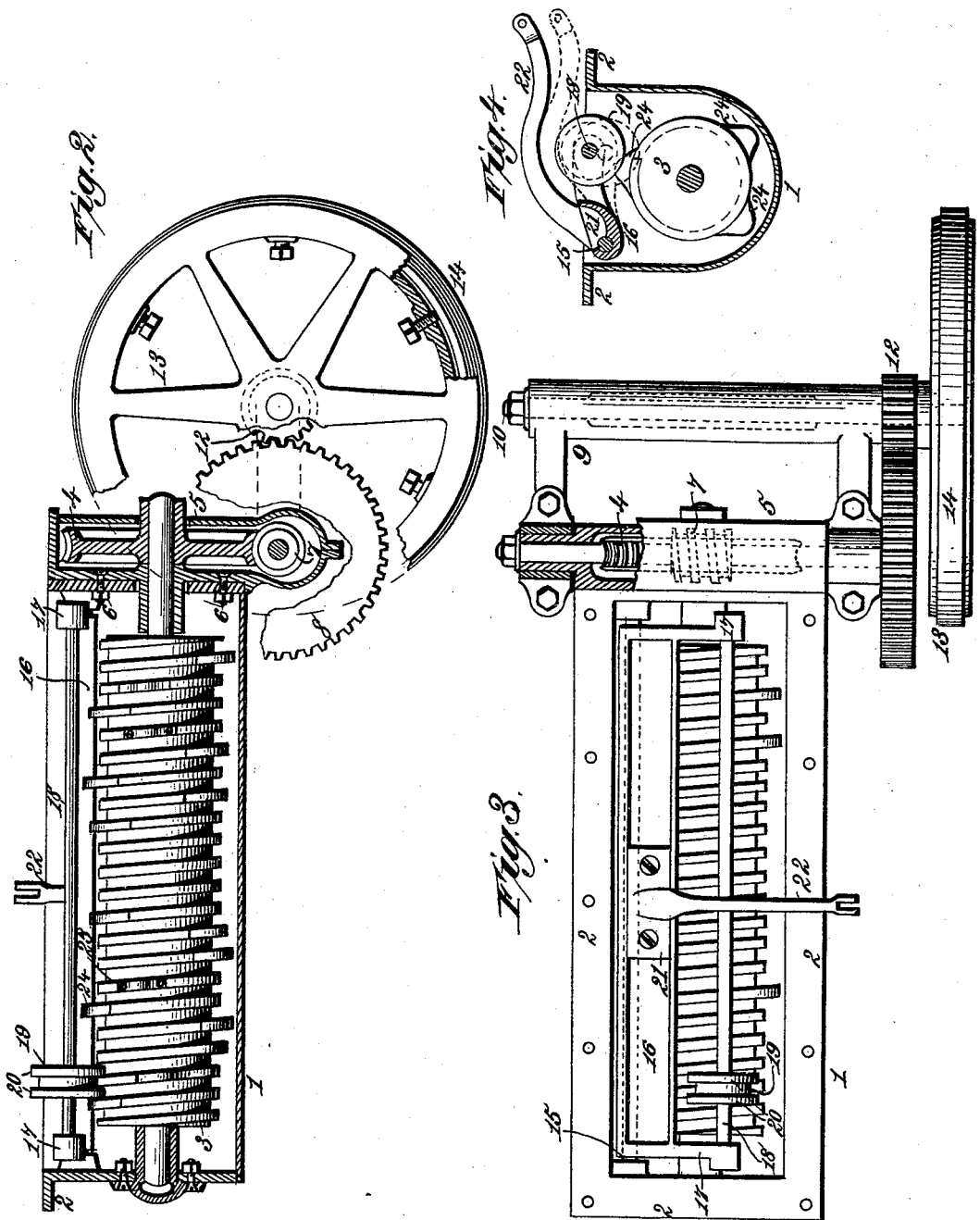

WILLIAM T. SNEDDEN, OF WYANDOTTE, KANSAS, ASSIGNOR TO HENRY B. BERRYMAN, OF BERKELEY, CALIFORNIA.

MECHANISM FOR OPERATING STATION-INDICATORS.

SPECIFICATION forming part of Letters Patent No. 416,305, dated December 3, 1889.

Application filed August 18, 1888. Renewed May 23, 1889. Serial No. 311,894. (No model.)

*To all whom it may concern:*

Be it known that I, WILLIAM T. SNEDDEN, a citizen of the United States, residing at Wyandotte, in the county of Wyandotte and State of Kansas, have invented new and useful Improvements in Mechanism for Operating Station-Indicators, of which the following is a specification.

My invention relates to station-indicators, and the purpose thereof is to provide simple and accurate mechanism for operating the indicating apparatus located in the car, whereby the names of stations or streets are successively exhibited in the order in which they are approached.

It is my purpose to provide a durable mechanism composed of few and simple parts and wholly automatic in operation, whereby the shifting of the indicator is accomplished at predetermined intervals without employing obstruction-bars or other local devices to time its operation.

It is my purpose, also, to so construct and combine the parts of mechanism of this type that they shall be actuated by a wheel traveling upon a rail of the track and arranged to have constant contact therewith under all circumstances, the arrangement being especially adapted to cars which run end for end, as well as to those which are turned at each end of the line and run both ways with the same end foremost.

The invention consists in the several novel features of construction and new combinations of parts hereinafter fully described, and then definitely pointed out in the claims.

In the accompanying drawings, Figure 1 is a side elevation showing my invention applied to a car, the latter being shown in dotted lines. Fig. 2 is a vertical longitudinal section showing the actuating mechanism detached from the car. Fig. 3 is a plan view of the parts shown in Fig. 2. Fig. 4 is a vertical cross-section of Fig. 2.

In the said drawings, the reference-numeral 1 designates a trough-shaped casing having flanges 2, by which it may be attached to a car beneath its floor by screws passing through openings in said flanges. Within this casing is arranged a spirally-threaded cylinder 3, having bearing in the ends of said casing and provided at one end with a worm-gear 4, mounted upon the shaft of the threaded cylinder and running in a separate casing 5, which is attached to the end of the casing 1 by bolts and nuts 6. In the bottom of the separate casing 5 is journaled a worm 7, meshing with the worm-gear 4 and having upon one end, which projects outside the casing, a spur-gear 8. Upon the axis of the worm 7 is mounted a yoke-frame 9, within which is journaled a shaft 10, having a pinion 12, which meshes with the spur-gear 8, and carrying upon its end outside the pinion a wheel 13, which is of any suitable diameter and is preferably provided with a rubber tire 14.

From the construction thus far described it will be seen that as the casing 1 rises and falls with the motion of the car-body to which it is attached the surface-wheel 13 will maintain its position, resting upon the rail or whatever surface it is arranged to travel upon, the yoke-frame 9 turning upon the axis of the worm 7 and spur-gear 8.

In suitable bearings in the casing 1 is journaled a shaft 15 parallel with the threaded cylinder 3, upon which is mounted a plate 16, having at its ends arms 17, which extend over the threaded cylinder 3 and receive a rod or bar 18, upon which is loosely mounted a roll 19, having a double flange 20 of dimensions to admit the cylinder-thread. The plate 16 is grooved out longitudinally upon its upper surface, both to lighten it and to receive a correspondingly-formed boss 21, formed upon the base of an arm 22, which is curved over and projects outward beyond the cylinder 3 and its casing and at right angles thereto. This arm is fastened in place upon the plate 16 by screws, and may be arranged thereon at any desired point. To its end is pivotally connected a rod 23, which passes upward through an opening in the floor of the car to the indicator-casing, where it is connected to the indicating mechanism.

Upon the thread of the cylinder 3 at different points are formed or mounted cam-blocks 24, having a width equal, or substantially so, to the width of the thread upon which they stand, whereby they may pass readily between the double flanges 20 of the roll 19.

These cam-blocks may be formed integral with the cylinder, or they may be constructed separately and fastened thereon by pins or small screws, as shown at 25, Fig. 2. The latter method of construction is preferable, as it permits their adjustment. The intervals between the successive cam-blocks upon the thread bear the same relative proportion to the distance between the stations or streets upon the line that the whole length of the thread bears to the length of the road upon which the stations occur.

The mechanism being constructed and arranged as described, and being attached to the car in the manner shown in Fig. 1, the operation is as follows: The surface-wheel 13, resting by gravity upon the rail, its weight being sufficient to insure a proper contact, and the car being set in motion, revolution is imparted through the pinion 12 and spur-gear 8 to the worm 7, and thence through the worm-gear 4 to the cylinder 3. The roll 19, being at the extreme end of the cylinder, rides upon its thread, slowly traversing the bar 18 until one of the cam-blocks 24 engages with it, whereupon the roll is lifted, raising the rod 18 and rocking or turning the plate 16, upon which is mounted the arm 22. This movement raises the end of said arm, as shown in Fig. 4, and gives an upward thrust to the rod 23, by which the indicator is operated. As the cam-block passes off the roll 19 the parts drop by gravity to their normal position, although a spring may be used to insure their return, if thought necessary.

Within the indicator-casing 26 in the car I may use any form of apparatus ordinarily employed for the purpose—as, for example, a cylinder having cards pivotally mounted at intervals on its periphery and displaying the names of the stations or streets. The cylinder has in apparatus of this type been operated heretofore by a ratchet on the cylinder carried by a pawl-lever fulcrumed on the shaft of the cylinder, and my invention is particularly adapted to operate indicators of this type, although it may be applied to others.

It will be seen that the movement of the cylinder is so far diminished relatively to the travel of the surface-wheel by the pinion 12 and spur-gear 8 and worm 7 that a threaded cylinder of comparatively small dimensions may suffice for a long line. It is evident, however, that additional retarding mechanism may be employed, if necessary, without any material change in my invention.

In cars running end for end the reversal of movement will reverse the travel of the cylinder and the movement of the roll 19, and the invention as constructed is specially adapted to cars of this class, as it is evident that the return of the roll 19 upon the cylinder-thread will correctly indicate the stations on the return run of the car. It will be seen, however, that the mechanism may by a very simple modification be adapted for use upon cars of the former class, which are turned at each end of the line. This may be done by cutting a reverse thread on the cylinder 3—a construction so familiar to artisans as to require no specific description—or by applying any one of the well-known forms of reversing-gear between the pinion 12 and the spur-gear 8.

What I claim is—

1. In mechanism for actuating station-indicators, the combination, with a surface-wheel supported on the body or frame of the car, of a threaded cylinder receiving revolution from said surface-wheel through the medium of retarding-gearing, a vibrating frame having a roll traveling upon the threads of said cylinder and carrying an arm or lever, and a station-indicator operated by said arm, the thread of the cylinder being provided at intervals with cam-blocks, substantially as described.

2. In mechanism for actuating station-indicators, the combination, with the indicating mechanism, of a rod actuating the same, an arm or lever connected to said rod, a vibrating frame carrying said rod and having a bar provided with a flanged roll revolving and traveling longitudinally on said bar, a cylinder having a spiral thread provided at intervals with cam-blocks upon which the flanged roll travels, retarding-gearing rotating the cylinder, and a surface-wheel journaled in a swinging frame mounted on the axis of one of the gears, the support for said wheel being mounted on the car-body to permit its running upon the rail, substantially as described.

3. In station-indicating mechanism, the combination, with an indicating apparatus, of a rod actuating the same, a lever raising said rod, a rocking frame carrying an arm connected to the rod and having a flanged roll loosely mounted on a bar on said frame, a cylinder having a spiral thread on which said roll rests and travels, and a surface-wheel mounted in a support attached to the body of the car and imparting revolution to said cylinder through suitable gearing, the thread of the cylinder being provided at proper intervals with cam-blocks, substantially as described.

4. In station-indicating mechanism, the combination, with a cylinder having a spiral thread provided at intervals with cam-blocks, of a pivotally-mounted frame having a bar parallel with and above said cylinder, a roll loosely mounted on said bar and resting and traveling upon the thread of the cylinder, and a surface-wheel journaled in a frame supported by the car-body and adapted to vibrate in an arc of a gear intermediate between said wheel and the gear on the cylinder-shaft, substantially as described.

5. In a station-indicating mechanism, the combination, with a surface-wheel journaled in a support mounted on the body of the car and suitable intermediate gearing, of a cylinder having a spiral thread, a rocking frame having a roll resting and traveling upon said thread, and an indicator actuated by a rod connected to said frame, the thread of the cylinder being provided at proper intervals with removable and adjustable cam-blocks, substantially as described.

6. In station-indicating mechanism, the combination, with a surface-wheel journaled in a support mounted on the body of the car and with suitable intermediate gearing, of a worm-gear meshing therewith, a cylinder on the shaft of said worm-gear having a spiral thread provided at intervals with cam-blocks, a rocking frame having a double-flanged roll riding upon the cylinder-thread and turning and moving longitudinally upon a rod or bar of the frame, an arm or lever adjustable upon the rocking frame, and a rod connecting said arm to the indicator mechanism, substantially as described.

In testimony whereof I affix my signature in presence of two witnesses.

WM. T. SNEDDEN.

Witnesses:
JAMES L. NORRIS,
JAMES A. RUTHERFORD.